Aug. 8, 1961

R. K. DOBBINS 2,995,116

VALVE ACTUATOR

Filed Jan. 27, 1958

INVENTOR.
RICHARD K. DOBBINS

BY *Arthur H. Swanson*

ATTORNEY.

United States Patent Office 2,995,116
Patented Aug. 8, 1961

2,995,116
VALVE ACTUATOR
Richard K. Dobbins, Hatboro, Pa., assignor to Minneapolis-Honeywell Regulator Company, Minneapolis, Minn., a corporation of Delaware
Filed Jan. 27, 1958, Ser. No. 711,410
16 Claims. (Cl. 121—41)

The present invention relates to electro-fluid valve actuators and particularly to electro-hydraulic valve actuators wherein a hydraulic system controlled by an electrical system is employed to position a valve stem.

Electro-hydraulic valve actuators have been known hereinbefore and have been used extensively to control the position of valve stems. The systems hereinbefore known and used have been satisfactory for many applications but have not been as widely employed as they might be due to certain shortcomings. The major shortcomings in previously known electro-hydraulic valve actuators have been that relatively large error signals had to be applied to the system in order to achieve full thrust on the piston rod or in other words output shaft of the hydraulic system. Moreover, systems hereinbefore known have been somewhat slow acting which imposed a limitation on the utility of this system.

Experimentation has shown that the addition of positive feedback to such an error signal will amplify this error signal and thus increase the sensitivity and response speed of such valve actuators.

To this end it is thus one of the chief objects of the present invention to superimpose such a positive feedback signal on an error signal of the aforementioned type so as to increase the speed at which this error signal can effect a change in the position of an actuator of a type to be hereinafter described.

Another object of the present invention is the provision of an electro-hydraulic valve actuator which is sensitive to relatively small electric input signals and hence does not necessitate the use of large error signals to achieve full thrust on the output shaft of the actuator.

Still another object of the present invention is to provide an improved electro-hydraulic valve actuator which is far faster acting than any actuator heretofore known.

A further object of the present invention is the provision of a new and improved electro-hydraulic valve actuator having means preventing oscillation or hunting.

Figure 1:
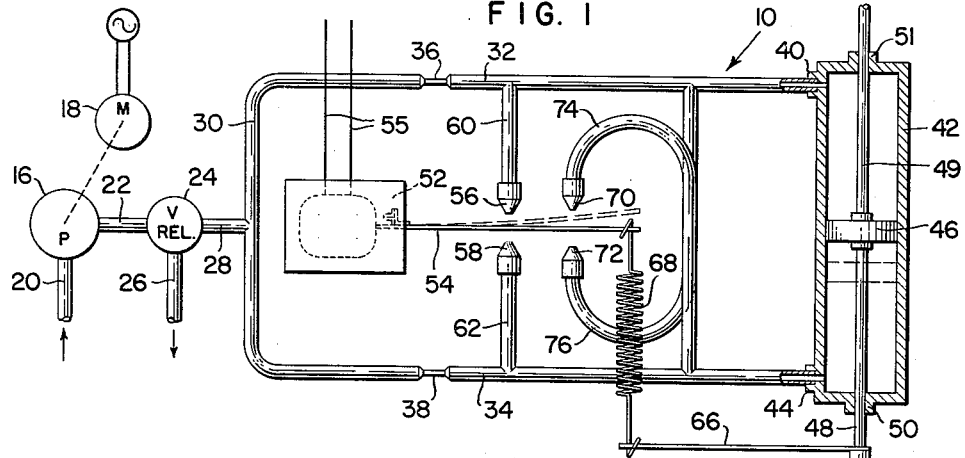
Figure 1:
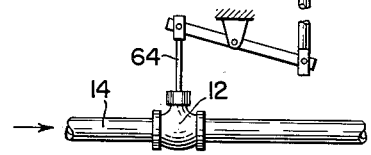
Figure 2:
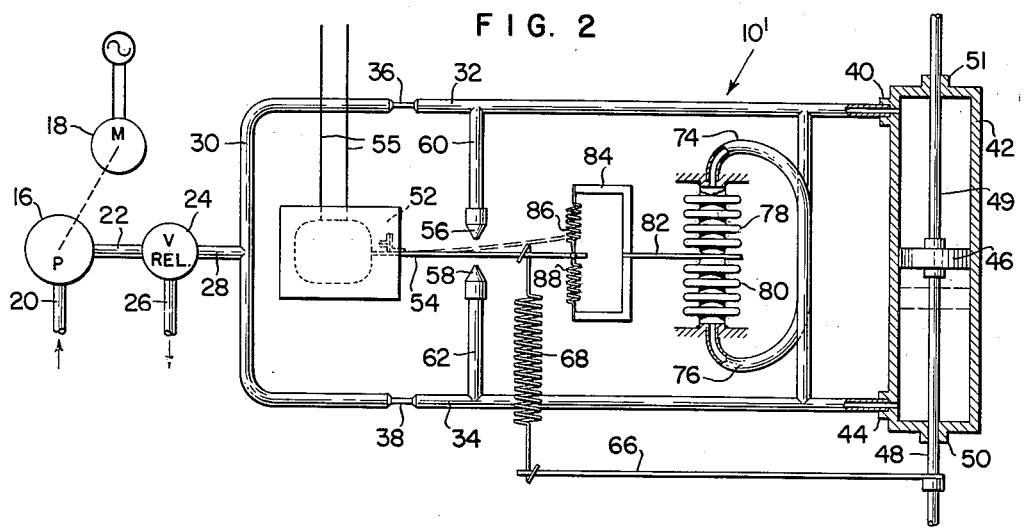
Figure 2:
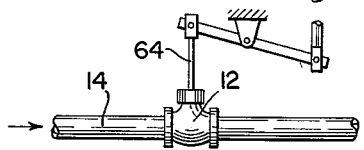

A better understanding of the present invention may be had from the following detailed description when read in connection with the accompanying drawing in which:

FIG. 1 is a diagrammatic view of one form of electro-hydraulic valve actuator embodying the present invention; and FIG. 2 is a diagrammatic view of a modified form of electro-hydraulic valve actuator embodying the present invention.

Referring now to the drawings in detail and particularly to FIG. 1, the electro-hydraulic valve actuator is generally designated by the numeral 10. Actuator 10 controls a valve 12 which controls the fluid flow through a pipe 14. The electro-hydraulic actuator 10 includes a hydraulic pump 16 which is driven by a motor 18 here shown as an electric motor, although other types of prime movers may be employed. It should also be understood that while the present application is described as using a hydraulic fluid to control the position of a valve actuating device it will be obvious that in certain applications it may be desirable to use air from a regulated air supply source in lieu of a hydraulic fluid to perform the hereinafter described valve positioning functions. Pump 16 pumps fluid from a sump (not shown) up through a pipe 20 and out through an outlet pipe 22 to a relief valve 24. Relief valve 24 is a three-way valve and provides a return 26 to the sump and an outlet 28 which goes to additional apparatus to be described hereinafter.

Outlet pipe 28 is connected to a manifold 30 having two spaced branch pipes or conduits 32 and 34. Branch 32 is connected to manifold 30 through a fixed restriction 26 whereas branch 34 is connected to manifold 30 through a fixed restriction 38. Branch pipe 32 is connected at the end remote from manifold 30 to an inlet 40 of a cylinder 42. Inlet 40 is disposed adjacent one end of the cylinder. At the end of branch pipe 34 remote from manifold 30 the branch pipe 34 is connected to an inlet 44 of cylinder 42, which inlet is disposed adjacent the opposite end of the cylinder 42 from the inlet 40. Disposed within the cylinder 42 is a piston 46 which has connected thereto a piston rod 48, 49 which extends out through the cylinder walls through a bushing 50, 51. Piston 46 is movable relative to the cylinder 42 and such movement is imparted to the piston when there is a force differential between the upper and lower surface portions of the piston 46 as viewed in FIG. 1. The force on the aforementioned piston surfaces is the product of the pressure in the respective cylinder chambers and the effected area exposed to the pressure on these respective piston surfaces.

The pressure in the upper and lower portions of cylinder 42 is controlled by an electrical control device 52 similar to that shown and described in U.S. patent application Serial No. 433,505, filed on June 1, 1954, by Philip E. Shafer, now Patent No. 2,847,619, and assigned to the assignee hereof. Suffice it to say, the electrical control device includes a flapper 54 which is movable and responds to an electric signal supplied to the device 52 through input conductors 55. If a more detailed description of device 52 is desired, reference may be had to the aforementioned Shafer application.

Flapper 54 extends between two nozzles 56 and 58 which are connected respectively to pipes 32 and 34 by pipes 60 and 62. When flapper 54 is equidistant between nozzles 56 and 58, then the pressure in pipes 32 and 34 is equal which results in equal pressure on both sides of piston 46 in cylinder 42. This will hold the piston stationary. Accordingly, the valve stem 64 of valve 12 will be in a stationary position and an amount of flow of fluid can then pass through pipe 14 depending upon the position of the valve stem at this moment. However, if a signal is supplied to device 52 to cause flapper 54 to move, for instance, closer to nozzle 56, then less fluid being supplied to pipe 32 through manifold 30 will be able to escape through nozzle 56 than will be able to escape through nozzle 58. Accordingly, the pressure in pipe 32 will be greater than the pressure in pipe 34 thereby resulting in a pressure differential in cylinder 42 which will cause piston 46 to move downwardly to the dotted line position as shown in FIG. 1 to thereby change the flow through pipe 14. Connected to piston rod 48 is a feedback link 66 which has connected at its free end a feedback spring 68 which is connected at the other end to the end of the flapper 54. Accordingly, when the piston 46 moves downwardly, the tension in spring 68 will be increased which will tend to move the flapper 54 down away from nozzle 56 and towards nozzle 58. At some location of piston 46, the force applied to the flapper 54 by device 52 will be balanced by the tension of the feedback spring 68 and at this point the device will stabilize itself to thereby stabilize the flow through pipe 14 at a new value. It will be obvious to anyone skilled in the art that when the system stabilizes with piston 46 at the aforementioned dotted line position, flapper 54 will be at a particular position wherein a force balance exists across the piston 46 with respect to the force due to flow being transmitted from valve 12 through 64.

The construction and operation described above has been known hereinbefore. The improvement in the device 10 resides in the provision of two additional nozzles 70 and 72 which are in spaced confronting relation and disposed on opposite sides of flapper 54. Nozzle 70 is on the same side of the flapper as is nozzle 56 but is connected by means of a pipe 74 to branch pipe 34. Nozzle 72 is on the same side of flapper 54 as is nozzle 58 but is connected to branch pipe 32 by a pipe 76. Nozzles 70 and 72 are equally spaced from the normal position of flapper 54 but at a greater distance than are nozzles 56 and 58 so that even when flapper 54 is fully deflected, it does not engage either nozzle 70 or 72. Accordingly, in the improved actuator described herein there is included on each side of the flapper 54 a nozzle connected to each branch pipe. By so constructing the actuator, it has been found that the actuator responds much more quickly to changes in the position of the flapper 54 and stabilizes much more rapidly as will now be described.

These desirable results stem from the following action of the apparatus. We assume first that there is a predetermnied force applied to flapper 54 by device 52 so that the flapper is in its neutral position and the piston 46 is in a position such as the solid line position as shown in FIG. 1. When a change in this signal is supplied over conductors 55 to device 52 to deflect flapper 54 to its dotted position shown in FIG. 1 the following will occur: The pressure in branch pipe 32 will become greater than the pressure in branch pipe 34 because there will be less flow of fluid out through nozzle 56 than through nozzle 58. With the pressure in branch pipe 32 greater than the pressure in branch pipe 34, the force exerted by the fluid flowing out of nozzle 72 against flapper 54 will be greater than the force exerted by the fluid flowing through nozzle 70. Accordingly, nozzle 72 will help deflect flapper 54 even more in an upward direction to thus cause an even greater pressure differential than would result if nozzles 70 and 72 were not present. Accordingly, the pressure at inlet 40 will be much greater than the pressure at inlet 44 and this will cause piston 46 to move downwardly towards its dotted line position as shown in FIG. 1 with greater speed than would be possible without the presence of nozzles 70 and 72. This rapid downward movement will continue until the force exerted by feedback spring 68 against the flapper 54 is sufficiently great to overcome the force exerted on flapper 54 by the device 52 and the nozzle 72. The feedback spring 68 together with its feedback link 66 will act to reposition flapper 54 at its neutral or solid line position. This repositioning will cause a decrease in the differential pressure between branch pipes 32 and 34, which decrease will be amplified in its effect on flapper 54 by the decrease in the force exerted by fluid flowing through auxiliary nozzle 72 against the flapper and an increase in the force exerted on flapper 54 by the fluid flowing through nozzle 70. This change in the forces exerted against flapper 54 by the fluid flowing through auxiliary nozzles 70 and 72 acts as a positive feedback force and accelerates the return of flapper 54 to its neutral position. The flapper 54 will thus stabilize in a much shorter time. Moreover, there will be much less tendency of the device to oscillate or hunt because of the presence of auxiliary nozzles 70 and 72 which will exert diminishing forces on flapper 54 as the flapper is repositioned.

From the foregoing it will be seen that by providing auxiliary nozzles 70 and 72 with cross connections as shown in FIG. 1, the auxiliary nozzles act first to cause an increase in the differential pressure between the two branch pipes 32 and 34 to cause a more rapid movement of piston 46 and subsequently act to accelerate the stabilization of the device at its new balanced point. Moreover, by providing the reversely connected auxiliary nozzles 70 and 72, force is always applied to the flapper 54 in such a direction as to oppose any tendency of the flapper to move under the bias of feedback spring 68 past its neutral position which might send the acutator into an oscillation.

Referring now to FIG. 2 wherein a modified embodiment 10′ of the present invention is shown, except as noted all of the parts thereof are the same as the parts described with regard to the embodiments shown in FIG. 1 and bear the same reference numerals. The major modification is the means for supplying force to the flapper 54 in opposed relation to the force applied to said flapper by the nozzles 56 and 58. In the modification shown in FIG. 1, opposed nozzles 70 and 72 were employed. In the present FIG. 2 form of the invention, crossed conduits 74 and 76, instead of being connected to nozzles 70 and 72, are connected to bellows 78 and 80, respectively. It should be clearly understood that pairs of other sensitive elements such as diaphragms or Bourdon tubes may be very satisfactorily used in such an actutaor in lieu of the bellows 78, 80. Bellows 78 and 80 have interposed therebetween a rigid plate 82 against which the confronting ends of the bellows 78 and 80 bear on opposite surfaces. The ends of the bellows 78 and 80 which are connected to the crossed conduits 74 and 76 are fixed in any suitable manner. Accordingly, any pressure differential in the bellows 78 and 80 will impart a vertical movement to plate 82. Plate 82 is fixed to a channel member 84 which has connected thereto two opposed springs 86 and 88 which in turn are fixed at their opposite ends to the flapper 54. Moreover, flapper 54 has connected therewith the feedback spring 68.

In operation, a signal is supplied through conductors 55 to device 52 so as to move flapper 54 from the solid position shown in FIG. 2 to the dotted position shown in FIG. 2, this movement will be resisted by the opposed springs 86 and 88 which are connected to the channel member 84. However, there will be upward movement to the dotted position, which movement will tend to decrease the amount of fluid flowing through nozzle 56 and increase the amount of fluid flowing through the nozzle 58. This change in flow will result in an increase in the pressure in branch conduit 32 and a decrease in pressure in the branch conduit 34, which pressure differential will move piston 46 from the solid position shown in FIG. 2 towards the dotted position shown in FIG. 2. Moreover, the increase in pressure in branch conduit 32 will cause bellows 80 which is connected to the branch conduit 32 by pipe 76 to extend upwardly and at the same time the decrease in pressure in branch conduit 34 will cause bellows 78 to compress so as to move its lower end upward. This upward vertical movement of the opposed ends of the bellows 78 and 80 will impart an upward movement to plate 82 which will in turn impart an upward movement to channel member 84 to thereby assist the upward movement of flapper 54. This additional upward force on flapper 54 will result in even a greater pressure differential between the branch conduits 32 and 34 to thus accelerate the movement of piston 46. However, at the same time the downward movement of piston 46 will impart a downward movement to the negative feedback link 66 which will tend to extend feedback spring 68 to thereby apply a downward force to plate 82 by way of elements 54, 86, 88 and 84. At some point in the movement of piston 46, the force of the negative feedback spring 68 will counteract the upward forces acting on flapper 54 which are being applied by device 52 and by springs 86 and 88 due to the opposing pressures in the positive feedback or regenerative bellows 78 and 80. At this point the device will tend to stabilize. It can thus be seen that the stabilizing effect is assisted by the opposed bellows since as the feedback spring pulls flapper 54 downwardly the pressure differential between the two branch conduits 32 and 34 starts to decrease. Accordingly, the end of bellows 78 which bears against plate 82 will start to move downwardly as will the end of bellows 80 to thereby assist the feedback spring in moving plate 82 downwardly. This in turn shifts channel member 84 in a downward direction to thereby assist in the downward movement of flapper 54 to its neutral position. However, since there will still be a larger pressure in conduit 32 than in conduit 34, bellows 80 will still be applying an upward force against plate 82 to resist its movement past the neutral position. Accordingly, the crossed bellows will act to resist the system from going into oscillation. However, it is to be noted that in view of the fact that the opposed bellows 78 and 80 cooperated with the device 52 in initially moving the flapper 54 away from its neutral position, there was an amplification of pressure differential between conduits 32 and 34 which thereby effected a more rapid movement of piston 46. This action of the bellows 78, 80 thus introduces a positive feedback similar to that which the fluid flowing from the nozzles 70, 72 provided as has been previously described. This, of course, effected a more rapid adjustment in the condition of valve 12. Therefore, with the structure shown in FIG. 1 or FIG. 2, I have provided an electro-hydraulic valve actuator which is far more sensitive and quicker acting in response to input signals to the device 52, which is more resistant to oscillation or hunting and which stabilizes more rapidly than devices of this nature heretofore known.

From the aforementioned description of the figures it can thus be seen that this application discloses an actuator in which the magnitude of an error signal, representing the difference between an input signal and a negative feedback signal, is altered by a positive feedback signal so that the actuator may be accurately repositioned in a rapid proportionate manner as changes in the aforementioned input signal takes place.

What is claimed is:

1. An improvement in a fluid control device comprising a first and second branch conduit each adapted to be connected by way of a restriction in one end portion thereof, to a fluid pressure source, a cylinder and a piston slidably disposed within said cylinder, a piston rod connected at one end to said piston and slidably extending through the ends of said cylinder, said cylinder having an inlet adjacent each end thereof, said first and second branch conduits being connected at their other ends to said cylinder inlets, a movable flapper having first and second opposed surfaces, means for moving said flapper in a direction normal to said first and second surfaces, a first nozzle connected to said first branch conduit at a position that is adjacent its other end and directed at said first surface of said flapper, a second nozzle connected to said second branch conduit at a position that is adjacent its other end and directed at said second surface of said flapper, and negative feedback means operatively connecting said piston rod to said flapper for moving said flapper directly in response to movement of said piston; and wherein said improvement comprising the aforementioned control device structure in combination with a positive feedback apparatus for increasing the rate at which said piston may be moved while minimizing the tendency for hunting of said control device, comprising a first means to apply a force to said first surface of said flapper which is proportional to the pressure of the fluid that is in the other end of the second branch conduit and a second means to apply a force to said second surface of said flapper which is proportional to the pressure of the fluid that is in the other end of the first branch conduit.

2. In a fluid control device including first and second branch conduits each adapted to be connected by way of a restriction in one end position thereof to a fluid pressure source, a cylinder and a piston slidably disposed within said cylinder, a piston rod connected at one end to said piston and slidably extending through the ends of said cylinder so that the ends of said piston rod are disposed outside of said cylinder, said cylinder having an inlet adjacent each end thereof, said first and second branch conduits being connected at their other ends to said cylinder inlets, a movable flapper having first and second opposed surfaces, means for moving said flapper in a direction normal to said first and second surfaces, a first nozzle connected to said first branch conduit at a position that is adjacent its other end and directed at said first surface of said flapper, a second nozzle connected to said second branch conduit at a position that is adjacent its other end and directed at said second surface of said flapper, and negative feedback means operatively connecting said piston rod to said flapper for moving said flapper in response to movement of said piston and a positive feedback means for increasing the rate at which said piston may be moved while minimizing the tendency for hunting of said control device, comprising a third nozzle directed at said first surface of said flapper and connected to said second branch conduit at a position that is adjacent its other end and a fourth nozzle directed at said second surface of said flapper and connected to said first branch conduit at a position that is adjacent its other end.

3. In a fluid control device including first and second branch conduits each adapted to be connected by way of a restriction in one end portion thereof to a fluid pressure source, a cylinder and a piston slidably disposed within said cylinder, a piston rod connected at one end to said piston and slidably extending through the ends of said cylinder so that the other ends of said piston rod are disposed outside of said cylinder, said cylinder having an inlet adjacent each end thereof, said first and second branch conduits being connected at their other ends to said cylinder inlets, a movable flapper having first and second opposed surfaces, means for moving said flapper in a direction normal to said first and second surfaces, a first nozzle connected to said first branch conduit at a position that is adjacent its other end and directed at said first surface of said flapper, a second nozzle connected to said second branch conduit at a position that is adjacent its other end and directed at said second surface of said flapper, negative feedback means operatively connecting said piston rod to said flapper for moving said flapper in response to movement of said piston and a positive feedback means for increasing the rate at which said piston may be moved while minimizing the tendency for hunting of said control device, comprising a first bellows fixed at one end and being operatively connected to said first surface of said flapper at the other end having a fluid conducting means connecting said first bellows to said second branch conduit at a position that is adjacent its other end and a second bellows fixed at one end and operatively connected to said second surface of said flapper at its other end having another fluid conducting means connecting said second bellows to said first branch conduit at a position that is adjacent its other end.

4. In a fluid control device including first and second branch conduits each adapted to be connected by way of a restriction in one end thereof to a fluid pressure source, a cylinder, a piston slidably disposed within said cylinder, a piston rod connected at one end to said piston and slidably extending through the ends of said cylinder so that the other ends of said piston rod are disposed outside of said cylinder, said cylinder having an inlet adjacent each end thereof, said first and second branch conduits being connected at their other ends to said cylinder inlets, a movable flapper having first and second opposed surfaces, means for moving said flapper in a direction normal to said first and second surfaces in accordance with the magnitude of a variable, means for applying a force to said first surface of said flapper proportional to the pressure in said first branch conduit at a position that is adjacent its other end, means for applying a force to said second surface of said flapper proportional to the pressure in said second branch conduit at a position that is adjacent its other end, negative feedback means operatively connecting said piston rod to said flapper for moving said flapper in response to movement of said piston and means for applying a portion of a positive feedback force to said first surface of said flapper in proportion to the pressure in said last-mentioned portion of the second branch conduit, another means to apply another portion of said positive feedback force to said second surface of said flapper in proportion to the pressure in said last-mentioned portion of the first branch conduit and wherein said positive feedback force applying means increases the rate at which said piston may be moved while minimizing the tendency for hunting of said control device.

5. An electro-hydraulic valve actuator, comprising first and second spaced branch conduits, each of said conduits being connected by way of a restriction in one end portion thereof to a manifold, means for supplying liquid under pressure to said manifold, a cylinder, first and second inlets adjacent opposite ends of said cylinder, said other end portion of the first and second branch conduits being connected respectively to said first and second cylinder inlets, a piston slidably disposed within said cylinder, a piston rod connected to said piston at one end and extending through an end of said cylinder and being adapted to be operatively connected to a valve stem adjacent its other end, an electrical control device including a flapper having first and second opposed surfaces and means for moving said flapper in a direction normal to said surfaces, a first nozzle directed at said first flapper surface and being connected to said first branch conduit at a position that is adjacent its other end portion, a second nozzle directed at said second flapper surface and being connected to said second branch conduit at a position that is adjacent its other end portion, means to apply a portion of a positive feedback force to said first surface of said flapper in proportion to the pressure in the other end portion of the second branch conduit, another means to apply a remaining portion of said positive feedback force to said second surface of said flapper in proportion to the pressure in the other end portion of the first branch conduit, a negative feedback means operatively connecting said piston rod to said flapper for moving said flapper in response to movement of said piston and wherein said positive feedback force applying means increases the rate at which said piston may be moved while minimizing the tendency for hunting of said valve actuator.

6. An electro-hydraulic valve actuator, comprising first and second spaced branch conduits, each of said conduits benig connected by way of a restriction in one end portion thereof to a manifold, means for supplying liquid under pressure to said manifold, a cylinder, first and second inlets adjacent opposite ends of said cylinder, other end portions of the first and second branch conduits being connected respectively to said first and second cylinder inlets, a piston slidably disposed within said cylinder, a piston rod connected to said piston at one end and extending through an end of said cylinder and being adapted to be operatively connected to a valve stem adjacent its other end, an electrical control device including a flapper having first and second opposed surfaces and means for moving said flapper in a direction normal to said surfaces, a first nozzle directed at said first flapper surface and being connected to said first branch conduit at a position that is adjacent its other end portion, a second nozzle directed at said second flapper surface and being connected to said second branch conduit at a position that is adjacent its other end portion, a positive feedback means comprising a third nozzle directed at said first surface of said flapper and connected to the other end portion of the second branch conduit and a fourth nozzle directed at second surface of said flapper and which is connected to the other end portion of the first branch conduit, a negative feedback means operatively connecting said piston rod to said flapper for moving said flapper in response to movement of said piston and wherein said positive feedback means increases the rate at which said piston may be moved while minimizing the tendency for hunting of said actuator.

7. An electro-hydraulic valve actuator, comprising first and second spaced branch conduits, each of said conduits being connected by way of a restriction in one end portion thereof to a manifold, means for supplying liquid under presure to said manifold, a cylinder, first and second inlets adjacent opposite ends of said cylinder, said first and second branch conduits being connected respectively to said other end portions of the first and second cylinder inlets, a piston slidably disposed within said cylinder, a piston rod connected to said piston at one end and extending through an end of said cylinder being adapted to be operatively connected to a valve stem adjacent its other end, an electrical control device including a flapper having first and second opposed surfaces and means for moving said flapper in a direction normal to said surfaces in accordance with the magnitude of a measured value, a first nozzle directed at said first flapper surface and being connected to said first branch conduit at a position that is adjacent its other end portion, a second nozzle directed at said second flapper surface and being connected to said second branch conduit at a position that is adjacent its other end portion, a positive feedback means comprising a first bellows fixed at one end and operatively connected to said first surface of said flapper at the other end and having a conduit means connecting said first bellows to said other end portion of the second branch conduit, said positive feedback means also being comprised of a second bellows fixed at one end and operatively connected to said second surface of said flapper at its other end which has a conduit means connecting said other end portion of the second bellows to said first branch conduit, and feedback means operatively connecting said piston rod to said flapper for moving said flapper in response to movement of said piston and wherein said positive feedback means increases the rate at which said piston may be moved while minimizing the tendency for hunting of said actuator.

8. An electro-hydraulic valve actuator, comprising first and second spaced branch conduits, each of said conduits being connected by way of a restriction in one end portion thereof to a manifold, means for supplying liquid under pressure to said manifold, a cylinder, first and second inlets adjacent opposite ends of said cylinder, other end portions of the first and second branch conduits connected respectively to said first and second cylinder inlets, a piston slidably disposed within said cylinder, a piston rod connected to said piston at one end and extending through an end of said cylinder and being adapted to be operatively connected to a valve stem adjacent its other end, an electrical control device including a flapper having first and second opposed surfaces and means for moving said flapper in a direction normal to said surfaces, a first nozzle directed at said first flapper surface and being connected to said first branch conduit at a position that is adjacent its other end portion, a second nozzle directed at said second flapper surface and being connected to said second branch conduit at a position that is adjacent its other end portion, a positive feedback means comprising a third nozzle directed at said first surface of said flapper and connected to the other end portion of the said second branch conduit and a fourth nozzle directed at said second surface of said flapper and connected to the other end portion of the said first branch conduit, a negative feedback means operatively connecting said piston rod and said flapper for moving said flapper in response to movement of said piston comprising a rigid member fixed to said piston rod and a tension spring connected at one end to said rigid member and connected at said other end to said flapper and wherein said positive feedback means increases the rate at which said piston may be moved while minimizing the tendency for hunting of said actuator.

9. An electro-hydraulic valve actuator, comprising first and second spaced branch conduits, each of said conduits being connected by way of a restriction in one end portion thereof to a manifold, means for supplying liquid under pressure to said manifold, a cylinder, first and second inlets adjacent opposite ends of said cylinder, other end portions of the first and second branch conduits connected respectively to said first and second cylinder inlets, a piston slidably disposed within said cylinder, a piston rod connected to said piston at one end and extending through an end of said cylinder and being adapted to be operatively connected to a valve stem adjacent its other end, an electrical control device including a flapper having first and second opposed surfaces and means for moving said flapper in a direction normal to said surfaces, a first nozzle directed at said first flapper surface and being connected to said first branch conduit at a position that is adjacent its other end portion, a second nozzle directed at said second flapper surface and being connected to said second branch conduit at a position that is adjacent its other end portion, said first and second nozzles being spaced equidistant from said first and second flapper surfaces, respectively when said piston is stationary relative to said cylinder, a positive feedback means comprising a third nozzle directed at said first surface of said flapper and connected to the other end portion of the said second branch conduit and a fourth nozzle directed at said second surface of said flapper and connected to the other end portion of the said first branch conduit, said third and fourth nozzles being spaced equidistant from said first and second flapper surfaces, respectively, when said piston is stationary relative to said cylinder, the spacing of said third and fourth nozzles from said first and second flapper surfaces being greater than the spacing of said first and second nozzles from said first and second flapper surfaces, negative feedback means operatively connecting said piston rod to said flapper for moving said flapper in response to movement of said piston and wherein said positive feedback means increases the rate at which said piston may be moved while minimizing the tendency for hunting of said actuator.

10. An electro-hydraulic valve actuator, comprising first and second spaced branch conduits, each of said conduits being connected by way of a restriction in one end portion thereof to a manifold, means for supplying liquid under pressure to said manifold, a cylinder, first and second inlets adjacent opposite ends of said cylinder, other end portions of the first and second branch conduits connected respectively to said first and second cylinder inlets, a piston slidably disposed within said cylinder, a piston rod connected to said piston at one end and extending through an end of said cylinder and being adapted to be operatively connected to a valve stem adjacent its other end, an electrical control device including a flapper having first and second opposed surfaces and means for moving said flapper in a direction normal to said surfaces, a first nozzle directed at said first flapper surface and being connected to said first branch conduit at a position that is adjacent its other end portion, a second nozzle directed at said second flapper surface and being connected to said second branch conduit at a position that is adjacent its other end portion, a positive feedback means comprising a pair of opposed tension springs each connected at one end to said flapper and each connected at their opposite end to a rigid channel, a rigid member fixed to said channel and extending away from said channel in a direction opposite to said flapper and having first and second opposed surfaces corresponding to said first and second flapper surfaces, said positive feedback means being further comprised of a first bellows connected at one end to said first surface of said rigid member and having the other end thereof fixed, said first bellows being connected by a conduit to said other end portion of the second branch conduit, a second bellows connected at one end to said second surface of said rigid member and having the other end thereof fixed, said second bellows being connected by a conduit to said other end portion of the first branch conduit, negative feedback means operatively connecting said piston rod to said rigid member for moving said rigid member in response to movement of said piston rod and wherein said positive feedback means increases the rate at which said piston may be moved while minimizing the tendency for hunting of said actuator.

11. An electro-hydraulic valve actuator, comprising first and second spaced branch conduits, each of said conduits being connected by way of a restriction in one end portion thereof to a manifold, means for supplying liquid under pressure to said manifold, a cylinder, first and second inlets adjacent opposite ends of said cylinder, other end portions of the first and second branch conduits connected respectively to said first and second cylinder inlets, a piston slidably disposed within said cylinder, a piston rod connected to said piston at one end and extending through an end of said cylinder and being adapted to be operatively connected to a valve stem adjacent its other end, an electrical control device including a flapper having first and second opposed surfaces and means for moving said flapper in a direction normal to said surfaces, a first nozzle directed at said first flapper surface and being connected to said first branch conduit at a position that is adjacent its other end portion, a second nozzle directed at said second flapper surface and being connected to said second branch conduit at a position that is adjacent its other end portion, a positive feedback means comprising a pair of opposed tension springs each connected at on end to said flapper and each connected at their opposite end to a rigid channel, a rigid member fixed to said channel and extending away from said channel in a direction opposite to said flapper and having first and second opposed surfaces corresponding to said first and second flapper surfaces, said positive feedback means being further comprised of a first bellows connected at one to said first surface of said rigid member and having the other end thereof fixed, said first bellows being connected by a conduit to said other end portion of the second branch conduit, a second bellows connected at one end to said second surface of said rigid member and having the other end thereof fixed, said second bellows being connected by a conduit to said other end portion of the first branch conduit, negative feedback means operatively connecting said piston rod to said rigid member for moving said rigid member in response to movement of said piston rod, said negative feedback means including another rigid member fixed to said piston rod, and a tension feedback spring connected at one end to said other rigid member and at its opposite end to said first mentioned rigid member and wherein said positive feedback means increases the rate at which said piston may be moved while minimizing the tendency for hunting of said actuator.

12. In a fluid control device including first and second branch conduits each adapted to be connected by way of a restriction in on end thereof to a fluid pressure source, a cylinder and a piston slidably disposed within said cylinder, a piston rod connected at one end to said piston and slidably extending through the ends of said cylinder so that the ends of said piston rod are disposed outside of said cylinder, said cylinder having an inlet adjacent each end thereof, said first and second branch conduits being connected at their other ends to said cylinder inlets, a movable flapper having first and second opposed surfaces, means for moving said flapper in a direction normal to said first and second surfaces, a first nozzle connected to said first branch conduit at a position which is adjacent its other end and directed at said first surface of said flapper, a second nozzle connected to said second branch conduit at a position which is adjacent its other end and directed at said second surface of said flapper, negative feedback means operatively connecting said piston rod to said flapper for moving said flapper in response to movement of said piston and a positive feedback means for increasing the rate at which said piston may be moved while minimizing the tendency for hunting of said control device comprising a third nozzle directed at said first surface of said flapper and connected to said second branch conduit at a position which is adjacent its other end and a fourth nozzle directed at said second surfaces of said flapper and connected to said first branch conduit at a position which is adjacent its other end.

13. In a fluid control device including first and second branch conduits each adapted to be connected by way of a restriction at one end thereof to a fluid pressure source, a cylinder, a piston slidably disposed within said cylinder, a piston rod connected at one end to said piston and slidably extending through the ends of said cylinder so that the other ends of said piston rod are disposed outside of said cylinder, said cylinder having an inlet adjacent each end thereof, said first and second branch conduits being connected at their other ends to said cylinder inlets, a movable flapper having first and second opposed surfaces, means for moving said flapper in a direction normal to said first and second surfaces, means for applying a force to said first surface of said flapper proportional to the pressure in said first branch conduit at a position that is adjacent its other end, means for applying a force to said second surface of said flapper proportional to the pressure in said second branch conduit at a position that is adjacent its other end, negative feedback means operatively connecting said piston rod to said flapper for moving said flapper in response to movement of said piston and a positive feedback means for affording a very rapid positioning of said piston without hunting being introduced into said control device comprising a means for applying force to said first surface of said flapper in proportion to the pressure in said second branch conduit at a position that is adjacent its other end and means for applying force to said second surface of said flapper in proportion to the pressure in said first branch conduit.

14. An electro-fluid actuator positioning apparatus comprising, a fluid supply transmitting conduit operably connected to a valve actuating means, a dual bleed valve means each connected by way of a restricted passageway to said conduit for bleeding a fluid flowing through said conduit to an ambient pressure, a control device, a pivoted flapper operably connected for movement at one end to said control device and at its other end to said bleed valve, a means connected to said control device to alter the position of said flapper with respect to said bleed valve and the amount of fluid flowing therefrom in accordance with changes in the magnitude of a signal being transmitted to said control device, a negative feedback spring operably connected to said actuator at one end and to said flapper at its other end, a positive feedback opposing nozzle means having a first nozzle operably connected by way of an open conduit to said fluid within one of said bleed valves and having another nozzle operably connected by way of a conduit to said fluid within the other of said bleed valves to apply a positive force to said flapper as said magnitude of said pressure in said conduit is altered by the flow of fluid flowing through said bleed valve to said ambient pressure and wherein said positive feedback opposing nozzle means increases the rate at which said valve actuating means may be moved while minimizing the tendency for hunting of said apparatus.

15. An electro-fluid actuator positioning apparatus comprising two separate fluid supply transmitting conduits operably connected to a valve actuating means, a bleed nozzle valve means connected by way of a restricted passageway to each of said conduits for bleeding a fluid flowing through each of the said conduits to an ambient pressure, a control device, a pivoted flapper operably connected for movement at one end to said control device and being positioned for movement at its other end between each of said nozzles, a means connected to said control device to alter the position of said flapper with respect to said bleed valve nozzles and the amount of fluid respectively flowing therefrom in accordance with changes in the magnitude of a signal being transmitted to said control device, a negative feedback spring operably connected to said actuator at one end and to said flapper at its other end and a positive feedback force means operably connected to the fluid in each of said transmitting conduits to apply a positive force to said flapper as said magnitude of said pressure in each of said conduits are altered by the flow of fluid flowing through said bleed nozzles to said ambient pressure and wherein said positive feedback force means increases the rate at which said valve actuating means may be moved while minimizing the tendency for hunting of said apparatus.

16. An electro-fluid actuator positioning apparatus comprising, a fluid supply transmitting conduit operably connected to a valve actuating means, a duel bleed valve means connected by way of a restricted passageway to said conduit for bleeding a fluid flowing through said conduit to an ambient pressure, a control device, a pivoted flapper operably connected for movement at one end to said control device and at its other end to said bleed valve, a means connected to said control device to alter the position of said flapper with respect to said bleed valve and the amount of fluid flowing therefrom in accordance with changes in the magnitude of a signal being transmitted to said control device, a negative feedback spring operably connected to said actuator at one end and to said flapper at its other end and a positive feedback amplifying means operably connected to said transmitting conduit to apply a positive force to said flapper as said magnitude of said pressure in said conduit is altered by the flow of fluid flowing through said bleed valve to said ambient pressure and wherein said positive feedback amplifying means increases the rate at which said valve actuating means may be moved while minimizing the tendency for hunting of said apparatus.

References Cited in the file of this patent

UNITED STATES PATENTS

| | | |
|---|---|---|
| 1,638,102 | Roucha | Aug. 9, 1927 |
| 2,053,797 | King | Sept. 8, 1936 |
| 2,241,330 | Shaw | May 6, 1941 |
| 2,285,540 | Stein | June 9, 1942 |
| 2,380,858 | McMahon | July 31, 1945 |
| 2,618,288 | Catheron | Nov. 18, 1952 |
| 2,630,824 | Eckman | Mar. 10, 1953 |
| 2,672,151 | Newbold | Mar. 16, 1954 |
| 2,711,187 | Bowditch | June 21, 1955 |
| 2,776,670 | Hunt | Jan. 8, 1957 |
| 2,797,666 | Chubbuck | July 2, 1957 |
| 2,814,487 | Medkeff | Nov. 26, 1957 |
| 2,911,991 | Pearl | Nov. 10, 1959 |
| 2,915,079 | Harrison | Dec. 1, 1959 |

FOREIGN PATENTS

| | | |
|---|---|---|
| 905,682 | Germany | Jan. 21, 1954 |
| 539,310 | Canada | Apr. 9, 1957 |